(No Model.)
G. A. LOWRY.
AUTOMATIC FEEDER FOR TWINE MACHINES.
No. 451,497. Patented May 5, 1891.
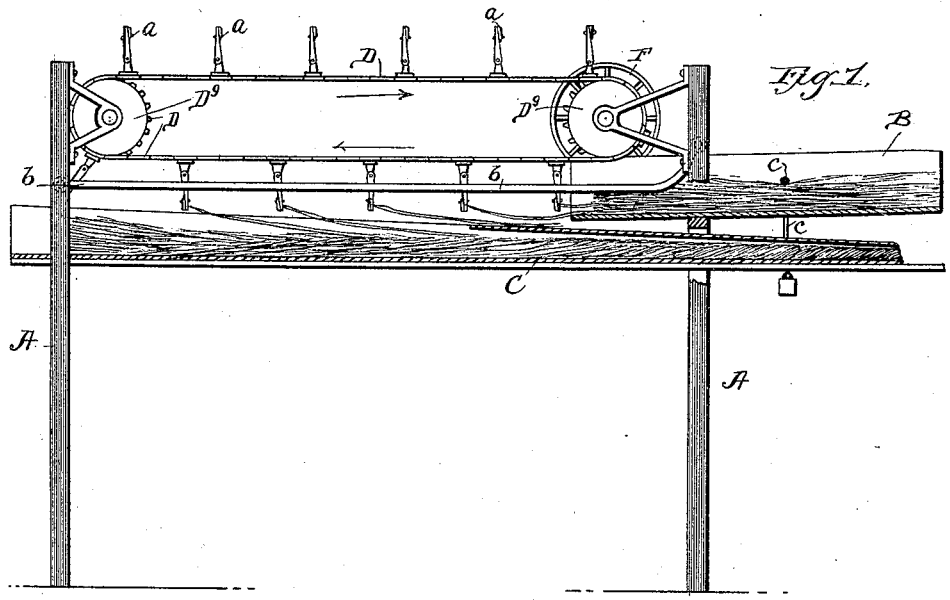
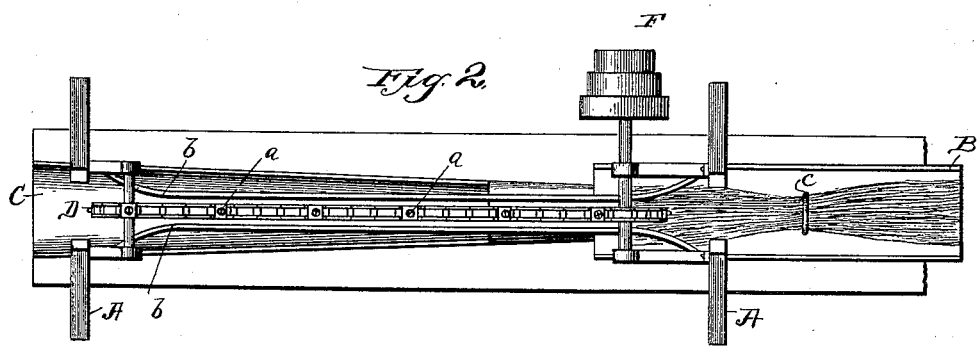
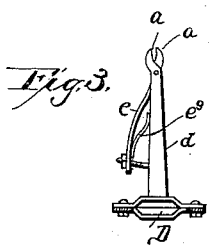
Witnesses:
Wm. M. Rheem
Frederick Searle
Inventor:
George A. Lowry, by
Butterworth Hall Brown & Smith
his Attorneys

UNITED STATES PATENT OFFICE.

GEORGE A. LOWRY, OF DES MOINES, IOWA, ASSIGNOR TO THE ALLIANCE TWINE COMPANY, OF SAME PLACE.

AUTOMATIC FEEDER FOR TWINE-MACHINES.

SPECIFICATION forming part of Letters Patent No. 451,497, dated May 5, 1891.

Application filed June 9, 1890. Serial No. 354,816. (No model.)

*To all whom it may concern:*

Be it known that I, GEORGE A. LOWRY, a citizen of the United States, residing at Des Moines, in the county of Polk and State of Iowa, have invented a new and useful Automatic Feeder for Twine-Machines, of which the following is a specification.

My invention relates to an improvement on the automatic feeder covered and described in the application, Serial No. 354,815, filed June 9, 1890, executed by me on 20th of May, 1890.

My invention consists in the construction hereinafter described, and finally pointed out in the claims.

In the drawings like letters refer to the same parts in the several figures, in which—

Figure 1 is a vertical section of my present automatic feeder and the tube or feeding-trough of the twine-making machine. Fig. 2 is a plan view of the same, and Fig. 3 is a side elevation of one of the nippers employed.

In the frame A, I mount a suitable trough B, which has its upper side open and is adapted to contain the hay, grass, or straw which is to be fed by my machine to the twine-making machine, such as is shown in my patent, No. 436,908, dated September 23, 1890.

Passing through apertures in the bottom of the trough is a rope or cord $c$, arranged to form a loop within the trough and having a weight secured to its lower ends outside of the trough, whereby the material within the latter is in a measure bunched and held to the action of the feeding mechanism hereinafter described. Arranged below this trough is a conveying-tube C, which is really a part of the twine-making machine.

Mounted in the frame A A in any suitable manner are sprocket-wheels $D^9$, over which passes an endless chain D, which is provided at suitable intervals with a series of nippers $a$. These nippers are in this instance composed of jaws $a\ a$, one fixed and the other pivoted, held normally open by a spring $e^9$, arranged between the tail $e$ of the movable and the standard $d$ of the fixed jaw.

Below the endless chain are arranged one or more inclined bars or cams $b\ b$. I prefer to employ two, because the one will then press against the tail of the movable jaw and the other will serve as a guide and bearing against which the standard of the fixed jaw may contact. These bars extend nearly the length of the machine in straight lines, but with inclined and flaring ends.

The operation of my machine is as follows: The material to be fed is placed in the trough B, the cord $c$ being lifted so as to provide a loop within which the material may be inserted and then is allowed to be drawn down by the weight attached to such looped cord. The endless chain containing the nippers is revolved by any suitable power in the direction of the trough containing the material, as indicated by the arrows, and the nippers upon such chain are successively embedded in such material. Just at the time each nipper is embedded in the material it enters between the cam-bars $b\ b$ before mentioned, and the straight sides thereof press against the same and force inward the movable jaw, and thus cause it to close upon such of the strands of the material as are between the jaws. Inasmuch as the cam-bars are straight for nearly the whole length of the chain, each nipper passing therethrough is caused to retain its bite of grass until the outer end of the cam-bars is reached, and at this point the nippers are forced to drop the material which they are carrying by reason of the cam-bars inclining away from them, and thus permitting the spring to again force open the movable jaw. The straws then fall into the trough C, where they are twisted into a twine or cord by the twine-making machine.

By means of a graduated pulley F or other similar device the endless chain with its nippers may be revolved more or less rapidly, and thus carry the material in greater or less quantities to the twisting mechanism of the twine-making machine. In this manner the size of the twine or cord may be regulated by the automatic feeder.

It is obvious that many modifications may be made in the several parts of this automatic feeder without changing the principle of the same.

What I claim, and desire to secure by Letters Patent, is—

1. An automatic feeder comprising an open-topped hopper B, an endless chain carrying nippers, each of which has one movable jaw, and a pair of bars extending in a straight line nearly the length of the endless chain, but having inclined ends, substantially as and for the purpose set forth.

2. An automatic feeder comprising an open-topped hopper B, an endless chain arranged above the same and carrying a series of nippers, each of which has a movable jaw, and one or more bars extending in a straight line nearly the length of the chain and having oblique or inclined ends.

3. An automatic feeder comprising an open-topped hopper B, an endless chain located above the same and carrying a series of nippers, each of which is provided with one fixed and one movable jaw, and one or more bars extending in a straight line nearly the length of the chain and having oblique ends, in combination with the feeding-trough for a twine-making machine arranged underneath the lower side of the endless chain aforesaid, substantially as and for the purpose set forth.

GEORGE A. LOWRY.

Witnesses:
F. J. SEARLE,
FREDERIC C. TAYLOR.